US012747329B2

(12) United States Patent
Cho et al.

(10) Patent No.: US 12,747,329 B2
(45) Date of Patent: Sep. 29, 2026

(54) COMPOSITE FILM HAVING A FUNCTIONAL LAYER AND DISPLAY DEVICE COMPRISING SAME

(71) Applicant: SK microworks solutions Co., Ltd., Chungcheongnam-do (KR)

(72) Inventors: Hyung-Woo Cho, Chungcheongnam-do (KR); Jun-Ki Park, Chungcheongnam-do (KR); Seok-Jong Woo, Chungcheongnam-do (KR); Seung-Yong Pyun, Chungcheongnam-do (KR)

(73) Assignee: MICROWORKS SOLUTIONS CO., LTD., Chungcheongnam-do (KR)

( * ) Notice: Subject to any disclaimer, the term of this patent is extended or adjusted under 35 U.S.C. 154(b) by 53 days.

(21) Appl. No.: 18/074,625

(22) Filed: Dec. 5, 2022

(65) Prior Publication Data

US 2023/0272178 A1 Aug. 31, 2023

(30) Foreign Application Priority Data

Feb. 25, 2022 (KR) ........................ 10-2022-0025455

(51) Int. Cl.
*C08J 7/044* (2020.01)

(52) U.S. Cl.
CPC ........... *C08J 7/044* (2020.01); *C08J 2379/08* (2013.01); *C08J 2433/14* (2013.01)

(58) Field of Classification Search
None
See application file for complete search history.

(56) References Cited

U.S. PATENT DOCUMENTS

| | | | | |
|---|---|---|---|---|
| 6,497,939 | B1 * | 12/2002 | Obuchi | G02B 6/0046 359/321 |
| 6,785,494 | B2 * | 8/2004 | Yamanoi | G03G 15/0216 399/168 |
| 2011/0070448 | A1 | 3/2011 | Matsumura et al. | |
| 2021/0094265 | A1 | 4/2021 | Ahn et al. | |
| 2021/0095174 | A1 * | 4/2021 | Ahn | C09D 183/06 |
| 2021/0325572 | A1 | 10/2021 | Ahn | |
| 2024/0158661 | A1 * | 5/2024 | Hirata | C09D 175/14 |

FOREIGN PATENT DOCUMENTS

| | | | | |
|---|---|---|---|---|
| CN | 102026795 | A | 4/2011 | |
| CN | 113534305 | A | 10/2021 | |
| JP | 2009-244461 | A | 10/2009 | |
| JP | 2012149227 | A * | 8/2012 | G02B 6/0043 |
| JP | 2017001330 | A | 1/2017 | |
| JP | 2018-053212 | A | 4/2018 | |
| JP | 2021187116 | A | 12/2021 | |
| KR | 10-2147330 | B1 * | 8/2020 | C08J 7/04 |
| KR | 10-2147367 | B1 | 8/2020 | |
| KR | 20210085638 | A | 7/2021 | |

OTHER PUBLICATIONS

Machine translation of JP 2017-001330 (Year: 2017).*
Machine translation of JP 2012-149227 A (Year: 2012).*

* cited by examiner

*Primary Examiner* — Ramsey Zacharia
(74) *Attorney, Agent, or Firm* — IP & T GROUP LLP

(57) ABSTRACT

The composite film according to an embodiment adopts an acrylate-based binder and an acrylamide-based monomer in a single functional layer for antistatic, antifouling, and chemical resistant functions to exhibit flexible characteristics without deteriorating the adhesive strength to a substrate; thus, it can be applied as a cover window of a flexible display device.

8 Claims, 3 Drawing Sheets

10

A - A'

[Fig. 1]
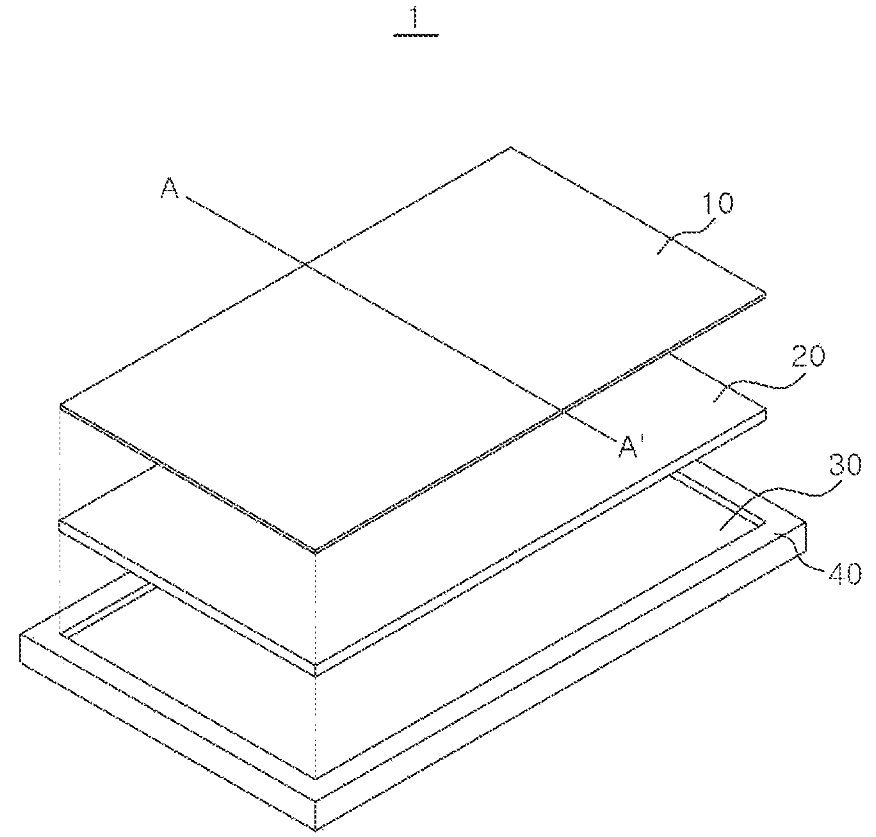
[Fig. 2]
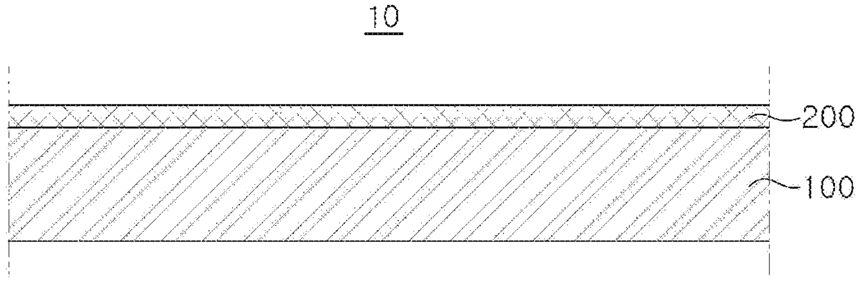
A - A'

[Fig. 3]
| | | |
|---|---|---|
| 5B | 0% | 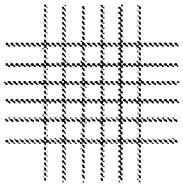 |
| 4B | < 5% | 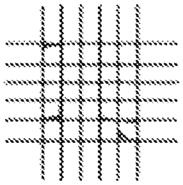 |
| 3B | 5~15% | 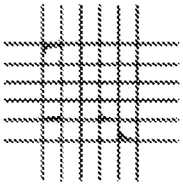 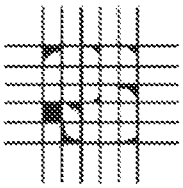 |
| 2B | 15~35% | 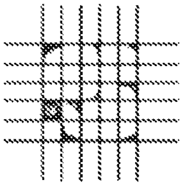 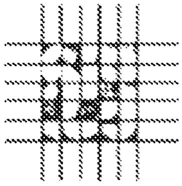 |
| 1B | 35~65% | 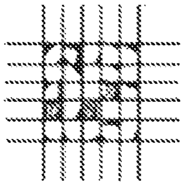 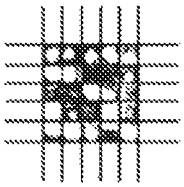 |
| 0B | > 65% | 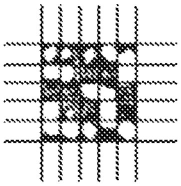 |

[Fig. 4]
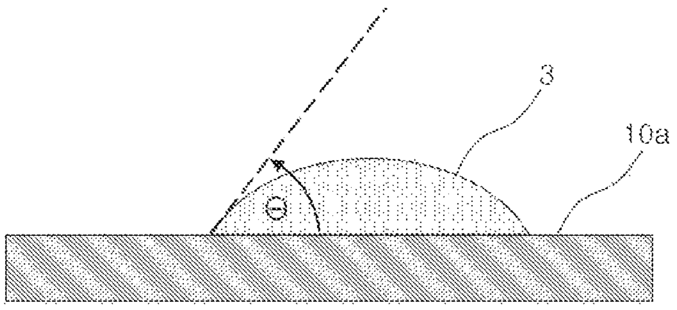
[Fig. 5]
(a)
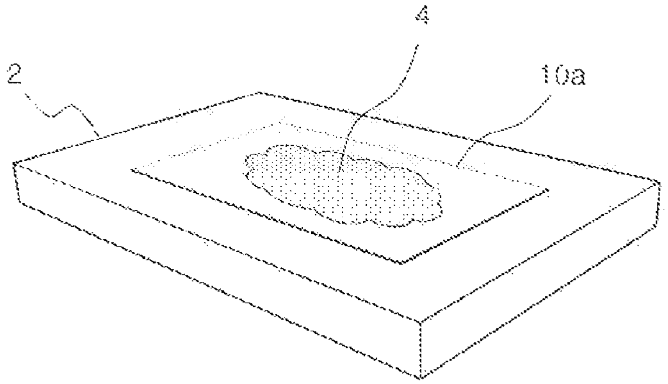
(b)
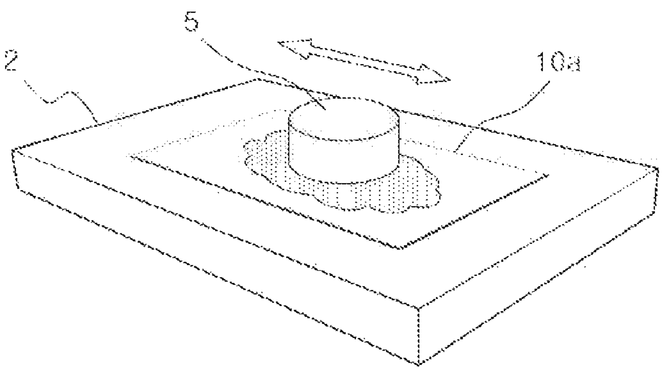

COMPOSITE FILM HAVING A FUNCTIONAL LAYER AND DISPLAY DEVICE COMPRISING SAME

CROSS-REFERENCE TO RELATED APPLICATION

This application claims benefit of priority to Korean Patent Application No. 10-2022-0025455 filed on Feb. 25, 2022 in the Korean Intellectual Property Office, the disclosure of which is incorporated herein by reference in its entirety.

TECHNICAL FIELD

Embodiments relate to a composite film having a functional layer for antistatic, antifouling, and chemical-resistant functions and to a display device comprising the same.

BACKGROUND ART

Display technologies continue to develop driven by the demand in tandem with the development in IT devices. Technologies on curved displays and bent displays have already been commercialized. In recent years, flexible display devices that can be flexibly bent or folded in response to an external force are preferred in the field of mobile devices that require large screens and portability at the same time. In particular, a foldable display device has the great advantages that it is folded to a small size to enhance its portability when not in use, and it is unfolded to form a large screen when in use.

A polymer film is preferred as a cover window for these flexible display devices. For example, polyimide-based films, such as polyamide-imide (PAI) films, are widely used since they are transparent, flexible, and excellent in mechanical properties. However, such polyimide-based films are vulnerable to external scratches. In addition, further improvement is required in terms of such characteristics as anti-fingerprint and antistatic functions required for cover windows.

For example, Korean Patent No. 2147367 discloses a film for a cover window in which a hard coating layer and an anti-fingerprint layer are formed on a base layer made of polyamide-imide (PAI) resin, which is applied to a flexible display.

Prior Art Document

Patent Document (Patent Document 1) Korean Patent No. 2147367

DISCLOSURE OF INVENTION

Technical Problem

In a flexible display device, such as an out-folding type, in which the front surface of the display is exposed to the outside, the cover window is required to have flexible characteristics and various functions (antistatic, antifouling, and chemical-resistant functions). However, when a plurality of functional layers are formed for this purpose, there would be a problem in that the process becomes complicated. Or, when various functions are implemented in a single layer, there would be a problem in that the adhesive strength to a substrate is reduced.

As a result of research conducted by the present inventors, therefore, a film whose adhesive strength to a substrate is not reduced has been achieved by introducing an acrylate-based binder and an acrylamide-based monomer into a single functional layer even if the functional layer further comprises such additives as an antistatic agent and an antifouling agent.

Accordingly, the embodiments to be described below aim to provide a composite film having a functional layer for antistatic, antifouling, and chemical-resistant functions and a display device comprising the same.

Solution to Problem

According to an embodiment, there is provided a composite film, which comprises a base film; and a functional layer formed on the base film, wherein the functional layer comprises an acrylate-based binder; and an acrylamide-based monomer.

According to another embodiment, there is provided a display device, which comprises a display panel; and a cover window disposed on the front side of the display panel, wherein the cover window comprises a base film; and a functional layer formed on the base film, and the functional layer comprises an acrylate-based binder; and an acrylamide-based monomer.

Advantageous Effects of Invention

According to the above embodiment, it is possible to achieve a film whose adhesive strength to a substrate is not reduced by using an acrylate-based binder and an acrylamide-based monomer even if such additives as an antistatic agent and an antifouling agent are introduced into a single functional layer.

Accordingly, not only can the composite film according to the above embodiment be prepared by a simple process, but also it has various functions such as antistatic, antifouling, and chemical-resistant functions, along with flexible characteristics, whereby it can be advantageously applied as a cover window for a flexible display device.

BRIEF DESCRIPTION OF DRAWINGS

FIG. 1 is an exploded perspective view of a display device according to an embodiment.

FIG. 2 is a cross-sectional view of a composite film (cover window) according to an embodiment.

FIG. 3 shows the evaluation criteria for a crosscut test according to ASTM D3359 Method B.

FIG. 4 shows a method for measuring the contact angle to the surface of a composite film.

FIG. 5 shows an abrasion resistance test method for evaluating chemical resistance.

EXPLANATION OF REFERENCE NUMERALS

1: display device, 2: test equipment, 3: water, 4: ethanol, 5: eraser, 0: contact angle, 10*a*: composite film sample, 10: composite film (cover window), 20: display panel, 30: substrate, 40: frame, 100: base film, 200: functional layer

BEST MODE FOR CARRYING OUT THE INVENTION

Hereinafter, various embodiments and examples will be described in detail by referring to the drawings.

In the description of the following embodiments, if it is determined that a detailed description of a relevant known constitution or function may obscure the subject matter, the detailed description thereof will be omitted. In addition, the sizes of individual elements in the drawings may be exaggeratedly depicted or omitted for the sake of description, and they may differ from the actual sizes.

In the present specification, when one component is described to be formed on/under another component or connected or coupled to each other, it covers the cases where these components are directly or indirectly formed, connected, or coupled through another component. In addition, it should be understood that the reference for the on/under position of each component may vary depending on the direction in which the object is observed.

In this specification, terms referring to the respective components are used to distinguish them from each other and are not intended to limit the scope of the embodiment. In addition, in the present specification, a singular expression is interpreted to cover a plural number as well unless otherwise specified in context.

In the present specification, the term "comprising" is intended to specify a particular characteristic, region, step, process, element, and/or component. It does not exclude the presence or addition of any other characteristic, region, step, process, element and/or component, unless specifically stated to the contrary.

In the present specification, the terms first, second, and the like are used to describe various components. But the components should not be limited by the terms. The terms are used for the purpose of distinguishing one element from another.

The molecular weight of a compound or polymer described in the present specification, for example, a number average molecular weight or a weight average molecular weight, is a relative mass based on carbon-12 as is well known. Although its unit is not described, it may be understood as a molar mass (g/mole) of the same numerical value, if necessary.

In the present specification, the term "substituted" means to be substituted with at least one substituent group selected from the group consisting of deuterium, —F, —Cl, —Br, —I, a hydroxyl group, a cyano group, a nitro group, an amino group, an amido group, a hydrazine group, a hydrazone group, an ester group, a ketone group, a carboxyl group, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ alkoxy group, a substituted or unsubstituted $C_6$-$C_{30}$ alicyclic organic group, a substituted or unsubstituted $C_4$-$C_{30}$ heterocyclic group, a substituted or unsubstituted $C_6$-$C_{30}$ aryl group, and a substituted or unsubstituted $C_4$-$C_{30}$ heteroaryl group. Two substituents adjacent to each other may be linked to form a ring.

FIG. 1 is an exploded perspective view of a display device according to an embodiment.

Referring to FIG. 1, a display device (1) according to an embodiment comprises a display panel (20); and a cover window (10) disposed on the front side (viewing side) of the display panel (20). Specifically, the display device (1) comprises a cover window (10), a display panel (20), a substrate (30), and a frame (40) protecting them. In addition, an adhesive layer may be interposed between the cover window (10) and the display panel (20). For example, the adhesive layer may comprise an optically transparent adhesive.

The display device according to an embodiment may be flexible. For example, the display device may be a flexible display device or a foldable display device.

The display panel (20) may be a liquid crystal display (LCD) panel. Alternatively, the display panel (20) may be an organic light emitting display (OLED) panel. The organic light emitting display device may comprise a front polarizing plate and an organic light emitting display panel. The front polarizing plate may be disposed on the front side of the organic light emitting display panel. In more detail, the front polarizing plate may be bonded to the side of the organic light emitting display panel where an image is displayed. The organic light emitting display panel displays an image by self-emission of a pixel unit. The organic light emitting display panel comprises an organic light emitting substrate and a driving substrate. The organic light emitting substrate comprises a plurality of organic light emitting units that correspond to respective pixels. The organic light emitting units each comprise a cathode, an electron transport layer, a light emitting layer, a hole transport layer, and an anode. The driving substrate is operatively coupled to the organic light emitting substrate. That is, the driving substrate may be coupled to the organic light emitting substrate so as to apply a driving signal such as a driving current. More specifically, the driving substrate may drive the organic light emitting substrate by applying a current to each of the organic light emitting units.

The composite film according to an embodiment is applied to the display device (1) as a cover window (10).

FIG. 2 is a cross-sectional view of a composite film (cover window) according to an embodiment.

Referring to FIG. 2, the composite film (10) according to an embodiment comprises a base film (100); and a functional layer (200) formed on the base film (100), wherein the functional layer (200) comprises an acrylate-based binder; and an acrylamide-based monomer.

Characteristics of the Composite Film

The composite film has characteristics that can be applied as a cover window.

The composite film according to an embodiment may have a light transmittance, for example, an average visible light transmittance of at least a certain level. As a result, it is advantageous to be applied to a cover window of a display device. For example, the film may have a light transmittance of 70% or more, 75% or more, 80% or more, 82% or more, 83% or more, 85% or more, or 90% or more. Meanwhile, the upper limit of the light transmittance range of the film is not particularly limited. It may be, for example, 100% or less, 98% or less, 95% or less, or 90% or less. The transmittance may be measured, for example, according to the ASTM D1003 standard.

In addition, the composite film according to an embodiment may have a haze of a certain level or less. As a result, it is advantageous to be applied to a cover window of a display device. For example, the film may have a haze of 5% or less, 4% or less, 3.5% or less, 3% or less, 2% or less, or 1.5% or less. Meanwhile, the lower limit of the haze range of the film is not particularly limited. It may be, for example, 0% or more, 0.5% or more, or 1% or more. The haze may be measured, for example, according to the ASTM D1003 standard.

As a specific example, the composite film may have a light transmittance of 90% or more and a haze of 1.5% or less.

In addition, the composite film according to an embodiment may have a surface hardness that can be applied as a cover window. For example, the functional layer of the composite film may have a surface hardness of HB or higher. Specifically, the surface hardness of the functional layer of the composite film may be H or higher, or 2H or higher, but it is not limited thereto. In addition, the composite film may have a Vickers hardness (Hv) of 30 $N/mm^2$ or more, more specifically, 35 $N/mm^2$ or more, 40 $N/mm^2$ or more, or 45 $N/mm^2$ or more, for the surface of the functional layer when measured by a nanoindentation test according to the ISO 14577-1:2002 (E) standard.

In particular, the composite film according to an embodiment has excellent adhesive strength between the functional layer and the base film. For example, the cross-cut test result according to the ASTM D3359 standard for the surface of the functional layer may be 3B or more, specifically 4B or more, or more specifically 5B.

In the cross-cut test, the sample surface is cut in a grid shape at regular intervals, an adhesive tape is attached and then detached, and the number of grid units delaminated is counted. According to the ASTM D3359 standard (Method B), it is evaluated by dividing it into five grades (0B to 5B) according to the percentage of the number of grid units, which are not delaminated, to the total number of grid units. The higher the grade number, the more excellent the adhesive strength between the layers (see FIG. 3).

In addition, the composite film according to an embodiment may have an excellent antistatic function. For example, the functional layer may have a surface resistance of $1\times10^{13}\Omega/\square$ □ or less. As a result, the composite film can prevent static electricity that may be generated during its processing or use, thereby maintaining its surface quality. Specifically, the functional layer may have a surface resistance of $1\times10^{12}\Omega/\square$ a or less or $1\times10^{11}\Omega/\square$ or less. More specifically, the surface resistance of the functional layer may be $1\times10^{6}\Omega/\square$ to $1\times10^{13}\Omega/\square$, $1\times10^{6}\Omega/\square$ to $1\times10^{11}\Omega/\square$, $1\times10^{8}\Omega/\square$ to $1\times10^{11}\Omega/\square$ a, or $1\times10^{10}\Omega/\square$ a to $1\times10^{11}\Omega/\square$.

In addition, the composite film according to an embodiment may have an excellent antifouling function. As a specific example, the water contact angle (initial contact angle, see FIG. 4) measured on the surface of the functional layer may be 100° or more, more specifically, 105° or more, 110° or more, 100° to 150°, or 100° to 130°.

In particular, the composite film according to an embodiment may have an antifouling function with high durability. For example, the water contact angle measured when an abrasion resistance test is carried out in a state in which an organic solvent such as ethanol (4) is applied to the surface of the functional layer (see FIG. 5) may be 80° or more, 85° or more, or 90° or more. As a specific example, the water contact angle measured when an eraser for an abrasion resistance test (5) is rubbed 3,000 times with a load of 1 kg in a state in which 10 μl of ethanol with a purity of 99.5% or more is applied to the surface of the functional layer may be 95° or more, more specifically 100° or more, 95° to 140°, 95° to 120°, or 95° to 110°, but it is not limited thereto.

Functional Layer

The functional layer is formed on a base film.

The functional layer may improve and supplement the physical properties of the base film, thereby enhancing the mechanical and/or optical properties of the composite film.

For example, the functional layer may serve as a hard coating layer to enhance the surface hardness of the composite film. In addition, the functional layer may serve as a hard coating layer, an antistatic layer, an antifouling layer, a chemical-resistant layer, a light-resistant layer, and a composite functional layer thereof of the composite film.

The functional layer may comprise at least one of an organic component, an inorganic component, and an organic-inorganic composite component.

As an example, the functional layer may comprise an organic resin. The organic resin may comprise a curable resin, specifically, a thermosetting resin or a UV curable resin. Accordingly, the functional layer may be a curable coating layer. The organic resin may serve as a binder.

According to an embodiment, the functional layer comprises an acrylate-based binder.

The content of the acrylate-based binder may be 30 to 95% by weight based on the weight of the functional layer. Specifically, the content of the acrylate-based binder may be 40 to 90% by weight or 50 to 80% by weight, based on the weight of the functional layer, but it is not limited thereto.

The acrylate-based binder may comprise at least one selected from a urethane acrylate-based compound and an epoxy acrylate-based compound.

As a specific example, the acrylate-based binder may comprise a urethane acrylate-based oligomer and an acrylate-based monomer. More specifically, the acrylate-based binder may comprise a urethane acrylate-based oligomer having 9 to 18 functional groups and an acrylate-based monomer having 1 to 15 functional groups.

The urethane acrylate-based compound may comprise a urethane bond as a repeat unit and may have a plurality of functional groups.

The urethane acrylate-based compound may be one in which a terminal of a urethane compound formed by reacting a diisocyanate compound with a polyol is substituted with an acrylate group. For example, the diisocyanate compound may comprise at least one of a linear, branched, or cyclic aliphatic diisocyanate compound having 4 to 12 carbon atoms and an aromatic diisocyanate compound having 6 to 20 carbon atoms. The polyol comprises 2 to 4 hydroxyl (—OH) groups and may be a linear, branched, or cyclic aliphatic polyol compound having 4 to 12 carbon atoms or an aromatic polyol compound having 6 to 20 carbon atoms. The terminal substitution with an acrylate group may be carried out by an acrylate-based compound having a functional group capable of reacting with an isocyanate group (—NCO). For example, an acrylate-based compound having a hydroxyl group or an amine group may be used, and a hydroxyalkyl acrylate or aminoalkyl acrylate having 2 to 10 carbon atoms may be used.

The urethane acrylate-based compound may comprise 1 to 18 functional groups, specifically, 2 to 18, 5 to 18, or 9 to 18 functional groups.

Examples of the urethane acrylate-based compound include a bifunctional urethane acrylate oligomer having a weight average molecular weight of 1,400 to 25,000, a trifunctional urethane acrylate oligomer having a weight average molecular weight of 1,700 to 16,000, a tetra-functional urethane acrylate oligomer having a weight average molecular weight of 500 to 2,000, a hexa-functional urethane acrylate oligomer having a weight average molecular weight of 818 to 2,600, an ennea-functional urethane acrylate oligomer having a weight average molecular weight of 2,500 to 5,500, a deca-functional urethane acrylate oligomer having a weight average molecular weight of 3,200 to 3,900, and a pentakaideca-functional urethane acrylate oligomer having a weight average molecular weight of 2,300 to 20,000, but it is not limited thereto.

The urethane acrylate-based compound may have a glass transition temperature (Tg) of −80° C. to 100° C.,−80° C. to 90° C., −80° C. to 80° C.,−80° C. to 70° C., −80° C. to 60° C.,−70° C. to 100° C.,−70° C. to 90° C., −70° C. to 80°

C.,−70° C. to 70° C., −70° C. to 60° C., −60° C. to 100° C.,−60° C. to 90° C., −60° C. to 80° C., −60° C. to 70° C., −60° C. to 60° C., −50° C. to 100° C., −50° C. to 90° C., −50° C. to 80° C., −50° C. to 70° C., or −50° C. to 60° C.

The epoxy acrylate-based compound may contain 1 to 10 functional groups.

Examples of the epoxy acrylate-based compound include a monofunctional epoxy acrylate oligomer having a weight average molecular weight of 100 to 300, a bifunctional epoxy acrylate oligomer having a weight average molecular weight of 250 to 2,000, and a tetra-functional epoxy acrylate oligomer having a weight average molecular weight of 1,000 to 3,000, but it is not limited thereto. The epoxy acrylate-based compound may have an epoxy equivalent of 50 g/eq. to 300 g/eq., 50 g/eq. to 200 g/eq., or 50 g/eq. to 150 g/eq.

According to an embodiment, the functional layer comprises an acrylamide-based monomer.

The acrylamide-based monomer may serve to prevent a decrease in the adhesive strength to a substrate that may occur when various functional additives such as an antistatic agent are introduced into a single functional layer.

As an example, the acrylamide-based monomer may be represented by Formula (I).

(I)

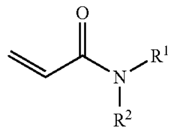

Here, $R^1$ and $R^2$ may each independently be hydrogen, a substituted or unsubstituted monovalent $C_6$-$C_{30}$ aliphatic cyclic group, a substituted or unsubstituted monovalent $C_4$-$C_{30}$ heteroaliphatic cyclic group, a substituted or unsubstituted monovalent $C_6$-$C_{30}$ aromatic cyclic group, a substituted or unsubstituted monovalent $C_4$-$C_{30}$ heteroaromatic cyclic group, a substituted or unsubstituted $C_1$-$C_{30}$ alkyl group, a substituted or unsubstituted $C_2$-$C_{30}$ alkenyl group, or a substituted or unsubstituted $C_2$-$C_{30}$ alkynyl group.

As a specific example, the acrylamide-based monomer may be at least one selected from the group consisting of N,N-dimethylacrylamide, N-hydroxyethylacrylamide, diacetoneacrylamide, N,N-dimethylaminopropylacrylamide, N,N-diethylacrylamide, and N-isopropylacrylamide.

The acrylamide-based monomer may be employed in an amount of greater than 0 part by weight to 40 parts by weight relative to 100 parts by weight of the acrylate-based binder.

For example, the content of the acrylamide-based monomer may be greater than 0 part by weight, 1 part by weight or more, 5 parts by weight or more, 10 parts by weight or more, 15 parts by weight or more, or 20 parts by weight or more, relative to 100 parts by weight of the acrylate-based binder. In addition, the content of the acrylamide-based monomer may be 40 parts by weight or less, 30 parts by weight or less, or 25 parts by weight or less, relative to 100 parts by weight of the acrylate-based binder. Specifically, the content of the acrylamide-based monomer may be 5 parts by weight to 25 parts by weight, 10 parts by weight to 20 parts by weight, 10 parts by weight to 15 parts by weight, or 15 parts by weight to 20 parts by weight, relative to 100 parts by weight of the acrylate-based binder, but it is not limited thereto.

As an example, the functional layer may further comprise an antistatic agent. For example, the antistatic agent may comprise at least one selected from an ionic surfactant and a conductive polymer.

The ionic surfactant may specifically comprise an ammonium salt or a quaternary alkylammonium salt. More specifically, the ammonium salt and the quaternary alkylammonium salt may comprise halides such as chlorides and bromides.

The conductive polymer may comprise polythiophene, polypyrrole, polyaniline, polyethylenedioxythiophene (PEDOT), or a mixture thereof. Specifically, the antistatic agent may comprise polyethylenedioxythiophene (PEDOT). More specifically, the antistatic agent may comprise polyethylenedioxythiophene: polystyrenesulfonate (PEDOT:PSS), but it is not limited thereto.

The content of the antistatic agent may be greater than 0 part by weight, 0.1 part by weight or more, 0.5 part by weight or more, 1 part by weight or more, or 3 parts by weight or more, and 15 parts by weight or less, 10 parts by weight or less, 7 parts by weight or less, 5 parts by weight or less, 3 parts by weight or less, or 1 part by weight or less, relative to 100 parts by weight of the acrylate-based binder Specifically, when the antistatic agent comprises an ionic surfactant, the content of the antistatic agent may be 1 part by weight to 10 parts by weight or 3 parts by weight to 7 parts by weight, relative to 100 parts by weight of the acrylate-based binder. When the antistatic agent comprises a conductive polymer, the content of the antistatic agent may be 0.1 part by weight to 3 parts by weight or 0.3 part by weight to 1 part by weight, relative to 100 parts by weight of the acrylate-based binder.

As another example, the functional layer may further comprise at least one selected from the group consisting of an antifouling agent, a UV absorber, and a photoinitiator.

The antifouling agent may comprise, for example, a fluorine-based compound. Specifically, the fluorine-based compound may be an acrylate-based compound having a perfluorine-based alkyl group. Specific examples thereof may include perfluorohexylethyl acrylate, but it is not limited thereto. The content of the antifouling agent may be 0.1 part by weight or more or 0.2 part by weight or more, and may be 3 parts by weight or less, 1 part by weight or less, or 0.5 parts by weight or less, relative to 100 parts by weight of the acrylate-based binder. Specifically, it may be 0.1 part by weight to 3 parts by weight or 0.1 part by weight to 1 part by weight.

Examples of the UV absorber include benzophenone-based compounds, benzotriazole-based compounds, and triazine-based compounds. The content of the UV absorber may be 1 part by weight or more, 3 parts by weight or more, or 5 parts by weight or more, and may be 15 parts by weight or less, 12 parts by weight or less, or 10 parts by weight or less, relative to 100 parts by weight of the acrylate-based binder. Specifically, it may be 1 part by weight to 15 parts by weight or 3 parts by weight to 12 parts by weight.

Examples of the photoinitiator include 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, and bis(2,4,6-trimethylbenzoyl)-phenylphosphine oxide, but it is not limited thereto. In addition, examples of commercially available photoinitiators include Irgacure™

184, Irgacure™ 500, Irgacure™ 651, Irgacure™ 369, Irgacure™ 907, Darocur™ 1173, Darocur™ MBF, Irgacure™ 819, Darocur™ TPO, Irgacure™ 907, and Esacure™ KIP 100F. The photoinitiator may be used alone or in combination of two or more different types. The content of the photoinitiator may be 1 part by weight or more or 3 parts by weight or more, and may be 12 parts by weight or less, 10 parts by weight or less, or 7 parts by weight or less, relative to 100 parts by weight of the acrylate-based binder. Specifically, it may be 1 part by weight to 12 parts by weight or 3 parts by weight to 7 parts by weight.

In addition, the functional layer may further comprise additives such as surfactants, light stabilizers, anti-yellowing agents, leveling agents, and dyes to improve color values. For example, the surfactant may be a monofunctional or bifunctional fluorine-based acrylate, a fluorine-based surfactant, or a silicone-based surfactant. The surfactant may be employed in a form dispersed or crosslinked in the functional layer. The content of the additives may be variously adjusted within a range that does not impair the physical properties of the functional layer. For example, the content of the additives may be 0.01 to 10% by weight based on the total weight of the functional layer, but it is not limited thereto.

In addition, the functional layer may optionally further comprise a filler. The filler may be, for example, inorganic particles. Examples of the filler include silica, barium sulfate, zinc oxide, and alumina. The filler may have a particle diameter of 1 nm to 100 nm. Specifically, the particle diameter of the filler may be 5 nm to 50 nm or 10 nm to 30 nm. The filler may comprise inorganic fillers having particle size distributions different from each other. For example, the filler may comprise a first inorganic filler having a D50 of 20 nm to 35 nm and a second inorganic filler having a D50 of 40 nm to 130 nm. The content of the filler may be 25% by weight or more, 30% by weight or more, or 35% by weight or more, based on the total weight of the functional layer. In addition, the content of the filler may be 50% by weight or less, 45% by weight or less, or 40% by weight or less, based on the total weight of the functional layer. Alternatively, the functional layer may not comprise an inorganic filler such as silica.

The functional layer may have a thickness of 2 μm or more, 3 μm or more, 5 μm or more, or 10 μm or more, and 50 μm or less, 30 μm or less, 20 μm or less, or 10 μm or less. For example, the thickness of the functional layer may be 2 μm to 20 μm. Specifically, the thickness of the functional layer may be 5 μm to 20 μm.

The functional layer may be directly formed on the surface of the base film. Specifically, another layer may not be present between the functional layer and the base film. In addition, any one of both sides of the functional layer may be provided as an interface between the functional layer and the base film. In particular, since the functional layer has excellent adhesive strength to the base film, it is possible to improve and supplement the insufficient physical properties of the base film while maintaining stable film characteristics.

The functional layer may be formed by applying a functional layer composition on the base film, followed by drying and curing thereof.

The functional layer composition may comprise additives such as an antistatic agent, an antifouling agent, a photoinitiator, and a UV absorber and a solvent, together with the acrylate-based binder and acrylamide-based compound described above.

Examples of the solvent include alcohol-based solvents such as methanol, ethanol, isopropyl alcohol, and butanol; alkoxy alcohol-based solvents such as 2-methoxyethanol, 2-ethoxyethanol, and 1-methoxy-2-propanol; ketone-based solvents such as acetone, methyl ethyl ketone, methyl isobutyl ketone, methyl propyl ketone, and cyclohexanone; ether-based solvent such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethylene glycol monopropyl ether, diethylene glycol monobutyl ether, and diethylene glycol-2-ethylhexyl ether; and aromatic solvents such as benzene, toluene, and xylene, which may be used alone or in combination thereof.

The content of the solvent is not particularly limited since it may be variously adjusted within a range that does not impair the physical properties of the coating composition. It may be employed such that the weight ratio of the solids content of the components contained in the functional layer composition to the solvent may be 20:80 to 99:1. Specifically, the solvent may be employed such that the weight ratio of the solids content of the components contained in the functional layer composition to the solvent may be 20:80 to 70:30, 20:80 to 60:40, 20:80 to 50:50, or 25:75 to 40:60, but it is not limited thereto. If the content of the solvent is within the above range, the composition may have appropriate flowability and coatability.

The functional layer composition may be applied through bar coating, knife coating, roll coating, blade coating, die coating, micro gravure coating, comma coating, slot die coating, lip coating, solution casting, or the like.

Thereafter, the solvent contained in the functional layer composition may be removed through a drying step. The drying step may be carried out at a temperature of 40° C. to 100° C., preferably 40° C. to 80° C., 50° C. to 100° C., or 50° C. to 80° C., for about 1 minute to 20 minutes, preferably 1 minute to 10 minutes or 1 minute to 5 minutes.

Thereafter, the functional layer may be cured by light and/or heat. As an example, the functional layer may be cured by irradiating UV light at a dose of 500 mJ/cm$^2$ to 1,000 mJ/cm$^2$ under a nitrogen atmosphere.

Base Film

The base film serves as a base film of the functional layer while imparting mechanical properties to the composite film.

The base film may be a polymer film, or a glass substrate, specifically, a reinforced glass substrate with a thickness of less than about 100 μm. For example, the base film may comprise at least one selected from the group consisting of a polymer film or ultra-thin glass (UTG).

Specifically, the base film may be a polymer film. That is, the base film may comprise a polymer resin.

According to an embodiment, the base film comprises a polyimide-based resin or a polyamide-based resin. Specifically, the base film may be a transparent polyimide-based or polyamide-based film.

The polyimide-based resin may be prepared by simultaneously or sequentially reacting reactants that comprise a diamine compound and a dianhydride compound. Specifically, the polyimide-based resin may comprise a polyimide-based polymer prepared by polymerizing a diamine compound and a dianhydride compound. The polyimide-based resin may comprise an imide repeat unit derived from the polymerization of a diamine compound and a dianhydride compound. In addition, the polyimide-based resin may be polymerized by further comprising a dicarbonyl compound. As a result, it may comprise a polyamide-imide-based polymer that further comprises an amide repeat unit derived from the polymerization of a diamine compound and a dicarbonyl compound.

The diamine compound is not particularly limited, but it may be, for example, an aromatic diamine compound that contains an aromatic structure. For example, the diamine compound may be a compound represented by the following Formula 1.

$H_2N\text{-}(E)_e\text{-}NH_2$ [Formula 1]

In Formula 1, E is selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —S—, —C(=O)—, —CH(OH)—, —S(=O)$_2$—, —Si(CH$_3$)$_2$—, —C(CH$_3$)$_2$—, and —C(CF$_3$)$_2$—; and e is selected from integers of 1 to 5. When e is 2 or more, the Es may be the same as, or different from, each other.

$(E)_e$ in Formula 1 may be selected from the groups represented by the following Formulae 1-1a to 1-14a, but it is not limited thereto.

1-1a

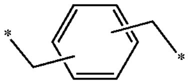

1-2a

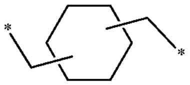

1-3a

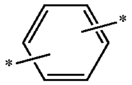

1-4a

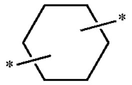

1-5a

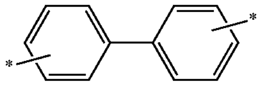

1-6a

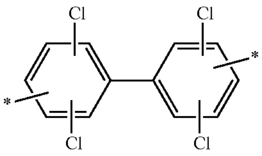

1-7a

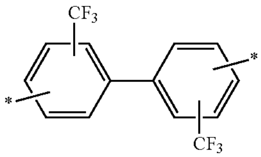

1-8a

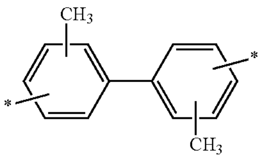

-continued 1-9a

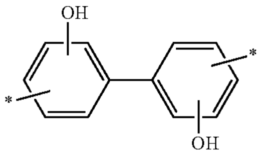

1-10a

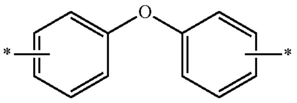

1-11a

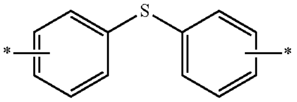

1-12a

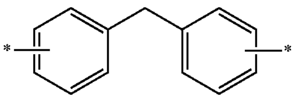

1-13a

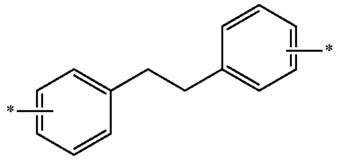

1-14a $*\text{—}(CH_2)_n\text{—}*$ (n is selected from integers of 1 to 12)

Specifically, $(E)_e$ in Formula 1 may be selected from the groups represented by the following Formulae 1-1b to 1-13b, but it is not limited thereto.

1-1b

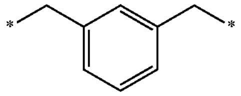

1-2b

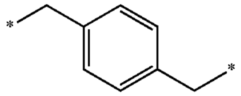

1-3b

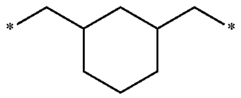

1-4b

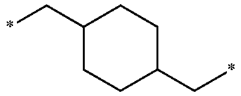

1-5b

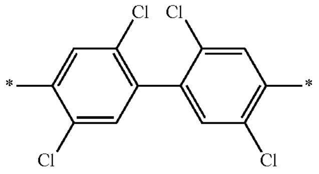

-continued 1-6b

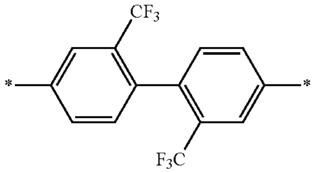

1-7b

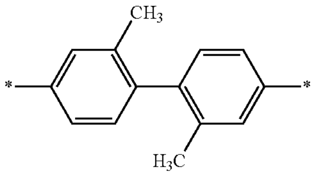

1-8b

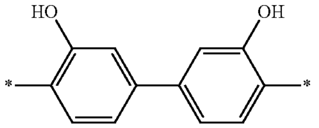

1-9b

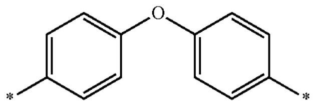

1-10b

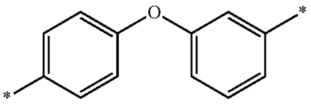

1-11b

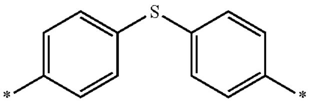

1-12b

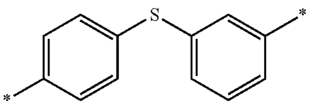

1-13b

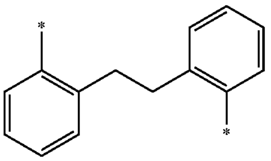

More specifically, $(E)_e$ in the above Formula 1 may be the group represented by the above Formula 1-6b.

In an embodiment, the diamine compound may comprise a compound having a fluorine-containing substituent. Alternatively, the diamine compound may be composed of a compound having a fluorine-containing substituent. In such an event, the fluorine-containing substituent may be a fluorinated hydrocarbon group and specifically may be a trifluoromethyl group. But it is not limited thereto.

In an embodiment, one kind of diamine compound may be used as the diamine compound. That is, the diamine compound may be composed of a single component.

For example, the diamine compound may comprise 2,2'-bis(trifluoromethyl)-4,4'-diaminobiphenyl (TFDB) represented by the following formula, but it is not limited thereto.

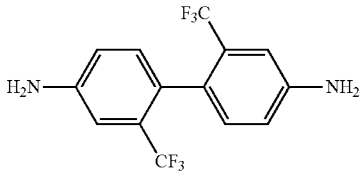

TFDB

The dianhydride compound has a low birefringence value, so that it can contribute to enhancements in the optical properties such as transmittance of a film that comprises the polyimide-based resin.

The dianhydride compound is not particularly limited, but it may be an aromatic dianhydride compound that contains an aromatic structure. For example, the aromatic dianhydride compound may be a compound represented by the following Formula 2.

[Formula 2]

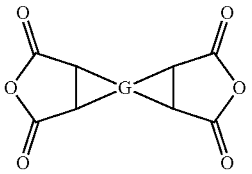

In Formula 2, G may be a group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, or a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone, may be fused to each other to form a condensed ring, or may be bonded by a bonding group selected from a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

G in the above Formula 2 may be selected from the groups represented by the following Formulae 2-1a to 2-9a, but it is not limited thereto.

2-1a

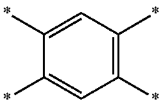

2-2a

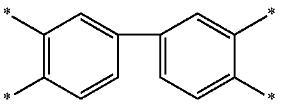

2-3a

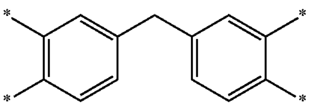

-continued 2-4a

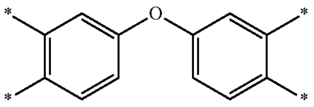

2-5a

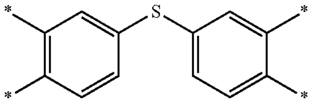

2-6a

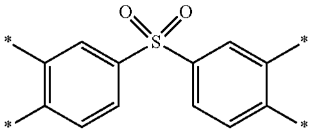

2-7a

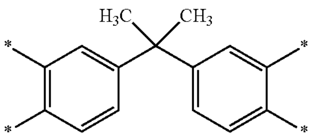

2-8a

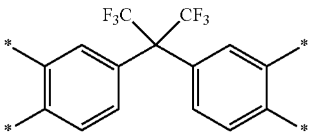

2-9a

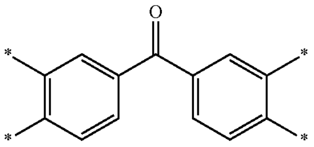

For example, G in the above Formula 2 may be the group represented by the above Formula 2-8a.

In an embodiment, the dianhydride compound may comprise a compound having a fluorine-containing substituent. Alternatively, the dianhydride compound may be composed of a compound having a fluorine-containing substituent. In such an event, the fluorine-containing substituent may be a fluorinated hydrocarbon group and specifically may be a trifluoromethyl group. But it is not limited thereto.

In another embodiment, the dianhydride compound may be composed of a single component or a mixture of two components.

For example, the dianhydride compound may comprise 2,2'-bis-(3,4-dicarboxyphenyl) hexafluoropropane dianhydride (6-FDA) represented by the following formula, but it is not limited thereto.

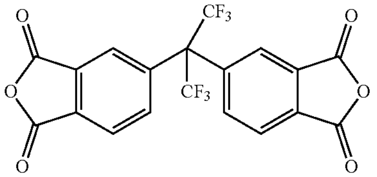

6-FDA

The diamine compound and the dianhydride compound may be polymerized to form a polyamic acid.

Subsequently, the polyamic acid may be converted to a polyimide through a dehydration reaction. The polyimide may comprise a repeat unit represented by the following Formula A.

[Formula A]

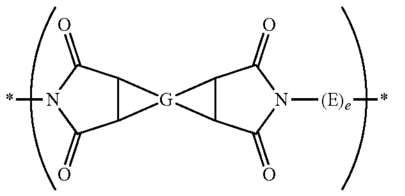

In Formula A, E, G, and e are as described above.

For example, the polyimide may comprise a repeat unit represented by the following Formula A-1, but it is not limited thereto.

[Formula A-1]

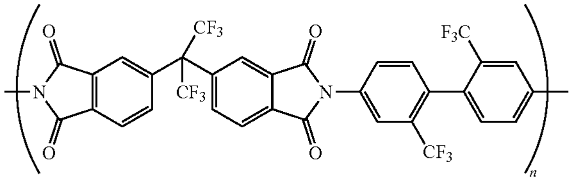

In Formula A-1, n may be an integer of 1 to 400.

The dicarbonyl compound is not particularly limited, but it may be, for example, a compound represented by the following Formula 3.

[Formula 3]

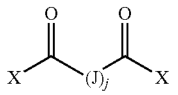

In Formula 3, J is selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, $—S(=O)_2—$, $—Si(CH_3)_2—$, $—C(CH_3)_2—$, and $—C(CF_3)_2—$; and j is selected from integers of 1 to 5. When j is 2 or more, the Js may be the same as, or different from, each other. X is a halogen atom. Specifically, X may be F, Cl, Br, I, or the like. More specifically, X may be Cl, but it is not limited thereto.

$(J)_j$ in the above Formula 3 may be selected from the groups represented by the following Formulae 3-1a to 3-14a, but it is not limited thereto.

3-1a

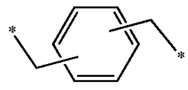

-continued 3-2a

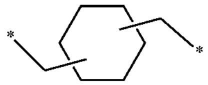

3-3a

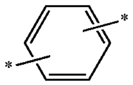

3-4a

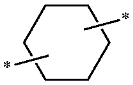

3-5a

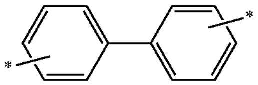

3-6a

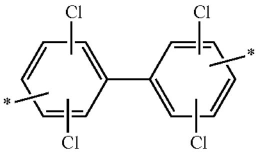

3-7a

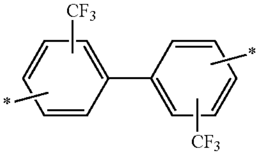

3-8a

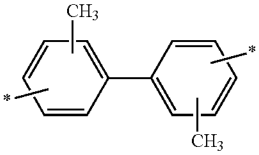

3-9a

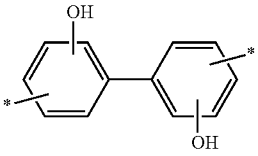

3-10a

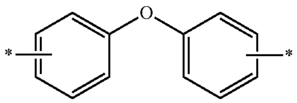

3-11a

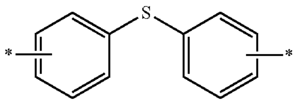

3-12a

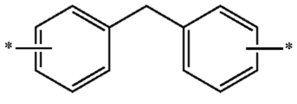

3-13a

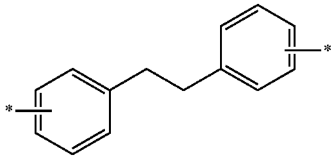

-continued 3-14a $*-(CH_2)_n-*$ (n is selected from integers of 1 to 12)

Specifically, $(J)_j$ in the above Formula 3 may be selected from the groups represented by the following Formulae 3-1b to 3-8b, but it is not limited thereto.

3-1b

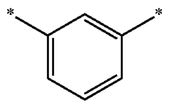

3-2b

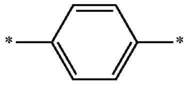

3-3b

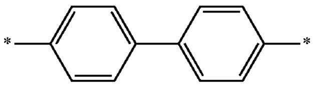

3-4b

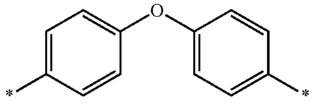

3-5b

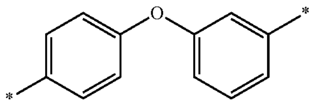

3-6b

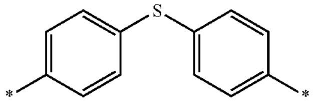

3-7b

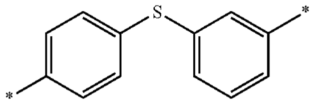

3-8b

More specifically, $(J)_j$ in Formula 3 may be the group represented by the above Formula 3-1b, the group represented by the above Formula 3-2b, or the group represented by the above Formula 3-3b.

In an embodiment, a mixture of at least two kinds of dicarbonyl compounds different from each other may be used as the dicarbonyl compound. If two or more dicarbonyl compounds are used, at least two dicarbonyl compounds in which (J); in the above Formula 3 is selected from the groups represented by the above Formulae 3-1b to 3-8b may be used as the dicarbonyl compound.

In another embodiment, the dicarbonyl compound may be an aromatic dicarbonyl compound that contains an aromatic structure.

For example, the dicarbonyl compound may comprise a first dicarbonyl compound and/or a second dicarbonyl compound different from the first dicarbonyl compound.

The first dicarbonyl compound and the second dicarbonyl compound may be an aromatic dicarbonyl compound, respectively.

The first dicarbonyl compound and the second dicarbonyl compound may be aromatic dicarbonyl compounds different from each other, but they are not limited thereto.

If the first dicarbonyl compound and the second dicarbonyl compound are an aromatic dicarbonyl compound, respectively, they comprise a benzene ring. Thus, they can contribute to improvements in the mechanical properties such as surface hardness and tensile strength of a film thus produced that comprises the polyamide-imide resin.

The dicarbonyl compound may comprise terephthaloyl chloride (TPC), isophthaloyl chloride (IPC), and 1,1'-biphenyl-4,4'-dicarbonyl dichloride (BPDC), as represented by the following formulae, or a combination thereof. But it is not limited thereto.

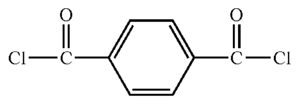

TPC

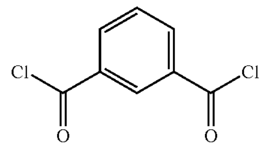

IPC

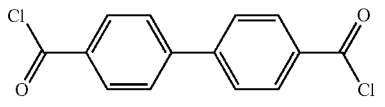

BPDC

For example, the first dicarbonyl compound may comprise BPDC, and the second dicarbonyl compound may comprise TPC, but they are not limited thereto.

Specifically, if BPDC is used as the first dicarbonyl compound and TPC is used as the second dicarbonyl compound in a proper combination, a film that comprises the polyamide-imide-based resin thus produced may have high oxidation resistance.

Alternatively, the first dicarbonyl compound may comprise IPC (isophthaloyl chloride), and the second dicarbonyl compound may comprise TPC, but they are not limited thereto.

Specifically, if IPC is used as the first dicarbonyl compound and TPC is used as the second dicarbonyl compound in a proper combination, a film that comprises the polyamide-imide-based resin thus produced may have high oxidation resistance, along with reduced manufacturing costs.

The diamine compound and the dicarbonyl compound may be polymerized to form a repeat unit represented by the following Formula B.

[Formula B]

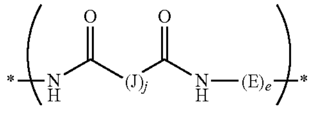

In Formula B, E, J, e, and j are as described above.

For example, the diamine compound and the dicarbonyl compound may be polymerized to form amide repeat units represented by the following Formulae B-1 and B-2.

[Formula B-1]

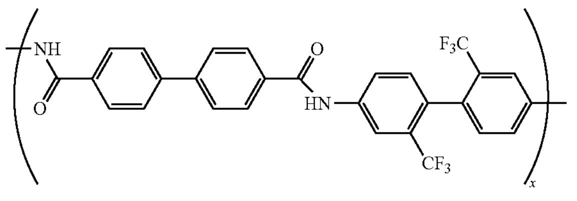

In Formula B-1, x is an integer of 1 to 400.

[Formula B-2]

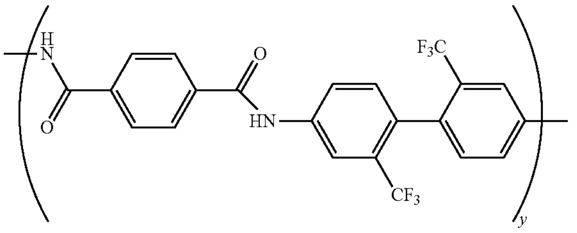

In Formula B-2, y is an integer of 1 to 400.

According to another embodiment, the base film may comprise a polyester-based resin. Specifically, the base film may be a transparent polyester-based film.

The polyester-based resin may be a homopolymer resin or a copolymer resin in which a dicarboxylic acid and a diol are polycondensed. In addition, the polyester-based resin may be a blend resin in which the homopolymer resins or the copolymer resins are mixed.

Examples of the dicarboxylic acid include terephthalic acid, isophthalic acid, orthophthalic acid, 2,5-naphthalene dicarboxylic acid, 2,6-naphthalene dicarboxylic acid, 1,4-naphthalene dicarboxylic acid, 1,5-naphthalene dicarboxylic acid, diphenylcarboxylic acid, diphenoxyethane dicarboxylic acid, diphenylsulfonic acid, anthracenedicarboxylic acid, 1,3-cyclopentanedicarboxylic acid, 1,3-cyclohexanedicarboxylic acid, 1,4-cyclohexanedicarboxylic acid, hexahydroterephthalic acid, hexahydroisophthalic acid, malonic acid, dimethyl malonic acid, succinic acid, 3,3-diethyl succinic acid, glutaric acid, 2,2-dimethylglutaric acid, adipic acid, 2-methyladipic acid, trimethyladipic acid, pimelic acid, azelaic acid, sebacic acid, suberic acid, dodecadicarboxylic acid, and the like.

In addition, examples of the diol include ethylene glycol, propylene glycol, hexamethylene glycol, neopentyl glycol, 1,2-cyclohexanedimethanol, 1,4-cyclohexanedimethanol, decamethylene glycol, 1,3-propanediol, 1,4-butanediol, 1,5-pentanediol, 1,6-hexanediol, 2,2-bis(4-hydroxyphenyl) propane, bis(4-hydroxyphenyl) sulfone, and the like.

Preferably, the polyester-based resin may be an aromatic polyester-based resin having excellent crystallinity. For example, it may have a polyethylene terephthalate (PET) resin as a main component.

When the base film is a polyester-based film, the polyester-based film may comprise a polyester-based resin, specifically a PET resin in an amount of about 85% by weight or more, more specifically, 90% by weight or more, 95% by weight or more, or 99% by weight or more. As another example, the polyester-based film may further comprise a polyester-based resin other than the PET resin. Specifically, the polyester-based film may further comprise up to about 15% by weight of a polyethylene naphthalate (PEN) resin. More specifically, the polyester-based film may further comprise a PEN resin in an amount of about 0.1 to 10% by weight or about 0.1 to 5% by weight.

The polyester-based film having the above composition may have increased crystallinity and enhanced mechanical properties in terms of tensile strength and the like in the process of preparing the same through heating, stretching, and the like.

The base film may further comprise a filler in addition to the polymer resin.

The filler may be at least one selected from the group consisting of barium sulfate, silica, and calcium carbonate. As the base film comprises the filler, it is possible to enhance the roughness and rollability and to enhance the sliding performance and the effect of improving scratches in the preparation of the film.

The filler may have a particle diameter of 0.01 μm to less than 1.0 μm. For example, the particle diameter of the filler may be 0.05 μm to 0.9 μm or 0.1 μm to 0.8 μm, but it is not limited thereto.

The filler may be employed in an amount of 0.01 to 3% by weight based on the total weight of the base film. For example, the filler may be employed in an amount of 0.05 to 2.5% by weight, 0.1 to 2% by weight, or 0.2 to 1.7% by weight, based on the total weight of the base film, but it is not limited thereto.

The base film may have a thickness of 20 μm or more, 30 μm or more, 40 μm or more, 50 μm or more, or 100 μm or more, and 500 μm or less, 400 μm or less, 300 μm or less, or 200 μm or less. As a specific example, the thickness of the base film may be 20 μm to 500 μm, more specifically 40 μm to 200 μm or 50 μm to 200 μm.

The base film may have a certain level of optical properties and mechanical properties.

The base film may have a haze of 3% or less. For example, the haze of the base film may be 2% or less, 1.5% or less, or 1% or less, but it is not limited thereto.

The base film may have a yellow index (YI) of 5 or less. For example, the yellow index of the base film may be 4 or less, 3.8 or less, 2.8 or less, 2.5 or less, 2.3 or less, or 2.1 or less, but it is not limited thereto.

The base film may have a modulus of 5 GPa or more. For example, the modulus of the base film may be 5.2 GPa or more, 5.5 GPa or more, 6.0 GPa or more, 10 GPa or less, 5 GPa to 10 GPa, or 7 GPa to 10 GPa, but it is not limited thereto.

The base film may have a transmittance of 80% or more. For example, the transmittance of the base film may be 85% or more, 88% or more, 89% or more, 80% to 99%, or 85% to 99%, but it is not limited thereto.

The base film may have a compressive strength of 0.4 kgf/μm or more. Specifically, the compressive strength of the base film may be 0.45 kgf/μm or more, or 0.46 kgf/μm or more, but it is not limited thereto.

The base film may have a surface hardness of HB or higher. Specifically, the surface hardness of the base film may be H or higher, or 2H or higher, but it is not limited thereto.

The base film may have a tensile strength of 15 $kgf/mm^2$ or more. Specifically, the tensile strength of the base film may be 18 $kgf/mm^2$ or more, 20 $kgf/mm^2$ or more, 21 $kgf/mm^2$ or more, or 22 $kgf/mm^2$ or more, but it is not limited thereto.

The base film may have an elongation of 15% or more. Specifically, the elongation of the base film may be 16% or more, 17% or more, or 17.5% or more, but it is not limited thereto.

MODE FOR THE INVENTION

The embodiments described below are provided to help understanding, and the scope of implementation is not limited thereto.

Preparation of Functional Layer Composition A

The components of Table 1 below were mixed in a solvent to obtain a functional layer composition A. A mixed solvent of methyl isobutyl ketone (MIBK), propylene glycol monomethyl ether (PM), methyl ethyl ketone (MEK), and ethanol was used as the solvent. The mixed solvent was blended such that the solids content was 25 to 40% by weight based on the total weight of the functional layer composition A.

TABLE 1

| Functional layer composition A | Component (excluding solvents) | part by weight (based on solids content) |
|---|---|---|
| Binder | Urethane acrylate oligomer having 9-18 functional groups<br>Acrylate monomer having 1-15 functional groups | 100 |
| Antistatic agent | Quaternary ammonium antistatic agent | 5 |
| Antifouling agent | Fluorine-based acrylate | 0.3 |
| UV absorber | Benzotriazole- and triazine-based UV absorber | 7 |
| Photoinitiator | α-Hydroxyalkylphenone and acylphosphine oxide | 5 |
| Acrylamide | N,N-Dimethylacrylamide | 10 |

Preparation of Functional Layer Composition B

The components of Table 2 below were mixed in a solvent to obtain a functional layer composition B. The type and blending amount of the solvent were the same as those of the functional layer composition A above.

TABLE 2

| Functional layer composition B | Component (excluding solvents) | part by weight (based on solids content) |
|---|---|---|
| Binder | Urethane acrylate oligomer having 9-18 functional groups<br>Acrylate monomer having 1-15 functional groups | 100 |
| Antistatic agent | Quaternary ammonium antistatic agent | 5 |
| Antifouling agent | Fluorine-based acrylate | 0.3 |
| UV absorber | Benzotriazole- and triazine-based UV absorber | 7 |
| Photoinitiator | α-Hydroxyalkylphenone and acylphosphine oxide | 5 |
| Adhesion improving agent | Bifunctional acrylic monomer (Miramer M262, M2300) | 10 |

Example 1: Preparation of a Composite Film

The functional layer composition A prepared above was coated with a Mayer bar on one side of a transparent polyimide-based film (TPI, SKC) having a thickness of 50 μm. Thereafter, it was thermally treated at 60° C. for 2 minutes to dry the solvent in the coating composition and irradiated with UV light at a dose of 500 to 1,000 $mJ/cm^2$ in a nitrogen atmosphere. As a result, a composite film in which a functional layer having a thickness of about 5 μm was formed on a polyimide-based film was obtained.

Example 2: Preparation of a Composite Film

The same procedures as in Example 1 were repeated to prepare a composite film, except that the content of acrylamide was adjusted to 20 parts by weight (on the basis of solids content) relative to 100 parts by weight of the binder.

Example 3: Preparation of a Composite Film

The same procedures as in Example 1 were repeated to prepare a composite film, except that 0.5 part by weight of an organic solvent-based conductive polymer (PEDOT-based), instead of the quaternary ammonium-based antistatic agent, was added in the functional layer composition.

Example 4: Preparation of a Composite Film

The same procedures as in Example 2 were repeated to prepare a composite film, except that 0.5 part by weight of an organic solvent-based conductive polymer (PEDOT-based), instead of the quaternary ammonium-based antistatic agent, was added in the functional layer composition.

Comparative Example 1: Preparation of a Composite Film

The same procedures as in Example 1 were repeated to prepare a composite film, except that the acrylamide and antistatic agent were not employed in the functional layer composition.

Comparative Example 2: Preparation of a Composite Film

The same procedures as in Example 1 were repeated to prepare a composite film, except that the acrylamide was not employed in the functional layer composition.

Comparative Example 3: Preparation of a Composite Film

A composite film was prepared in the same manner as in Example 1 using the functional layer composition B.

Comparative Example 4: Preparation of a Composite Film

The same procedures as in Comparative Example 3 were repeated to prepare a composite film, except that the content of acrylic monomer was adjusted to 20 parts by weight (on the basis of solids content) relative to 100 parts by weight of the binder.

Comparative Example 5: Preparation of a Composite Film

The same procedures as in Example 3 were repeated to prepare a composite film, except that the acrylamide was not employed in the functional layer composition.

Comparative Example 6: Preparation of a Composite Film

The same procedures as in Comparative Example 3 were repeated to prepare a composite film, except that 0.5 part by weight of an organic solvent-based conductive polymer (PEDOT-based), instead of the quaternary ammonium-based antistatic agent, was added in the functional layer composition.

Comparative Example 7: Preparation of a Composite Film

The same procedures as in Comparative Example 4 were repeated to prepare a composite film, except that 0.5 part by weight of an organic solvent-based conductive polymer (PEDOT-based), instead of the quaternary ammonium-based antistatic agent, was added in the functional layer composition.

Test Example 1: Adhesive Strength (Cross-Cut Test)

The adhesive strength between the functional layer and the base film of a composite film sample was evaluated by a cross-cut test. According to the ASTM D3359 standard (Method B), the surface of the functional layer was cut in a grid shape at regular intervals, an adhesive tape (3M's Scotch™ Magic Tape) was attached and then detached, and the degree of delamination of grid units from the surface was evaluated. It was graded from 0B to 5B according to the following criteria, and 5B was evaluated as the best (see FIG. 3).

5B: the cut surface was clean, and the square of grid was not separated (0% of the grid area)

4B: small pieces of coating were separated at intersections (less than 5% of the grid area)

3B: small pieces of coating were separated along the edges and at cut-off intersections (5% to less than 15% of the grid area)

2B: the cut edge of coating and a part of the rectangle were separated (15% to less than 35% of the grid area)

1B: the coating was largely peeled off along the edge of the cut surface, and the squares were separated (35-65% of the grid area)

0B: the coating was peeled off, and the degree of separation of the squares became more severe (greater than 65% of the grid area)

Test Example 2: Surface Resistance

The resistance was measured by applying a voltage of 100 V to the surface of the functional layer of a composite film sample using a surface resistance measuring device (ST-4 of SIMCO Ion).

Test Example 3: Antifouling (Initial Contact Angle)

The water contact angle of the functional layer surface of a composite film sample was measured using 3.0 μl of water droplets with a contact angle measuring instrument (DM-CE1 of Kyowa Corporation). When the initial contact angle is 100° or more, it may be determined as good (see FIG. 4).

Test Example 4: Chemical Resistance (Contact Angle after Chemical Resistance Test)

10 μl of ethanol with a purity of 99.5% or more was applied to the surface of the functional layer of a composite film sample, and an eraser (Minoan Inc.) for an abrasion resistance test was rubbed 3,000 times with a load of 1 kg on the surface to which ethanol had been applied using an abrasion resistance test device (Daesung Precision). The water contact angle was then measured in the same manner as in Test Example 3. When the contact angle is 95° or more after the abrasion resistance test, it may be determined as good (see FIG. 5).

Configurations of the Examples and Comparative Examples and their test results are summarized in the table below.

TABLE 3

| Unit | Acrylamide part by weight* | Acryl monomer part by weight* | Antistatic agent | Cross-cut test | Surface resistance Ω/□ | Initial contact angle ° | Contact angle after chemical resistance test ° |
|---|---|---|---|---|---|---|---|
| Ex. 1 | 10 | — | Quaternary ammonium-based | 4B | $2 \times 10^{10}$ | 111.3 | 98.7 |
| Ex. 2 | 20 | — | Quaternary ammonium-based | 5B | $1 \times 10^{10}$ | 109.8 | 102.8 |
| Ex. 3 | 10 | — | Conductive polymer | 4B | $8 \times 10^{10}$ | 111.6 | 100.2 |
| Ex. 4 | 20 | — | Conductive polymer | 5B | $7 \times 10^{10}$ | 109.8 | 101.3 |
| C. Ex. 1 | — | — | — | 5B | $>1 \times 10^{13}$ | 109.3 | 105.2 |
| C. Ex. 2 | — | — | Quaternary ammonium-based | 0B | $1 \times 10^{10}$ | 110.1 | 78.1 |
| C. Ex. 3 | — | 10 | Quaternary ammonium-based | 0B | $2 \times 10^{10}$ | 107.8 | 68.3 |
| C. Ex. 4 | — | 20 | Quaternary ammonium-based | 0B | $1 \times 10^{10}$ | 109.3 | 58.1 |
| C. Ex. 5 | — | — | Conductive polymer | 0B | $8 \times 10^{10}$ | 110.3 | 76.2 |
| C. Ex. 6 | — | 10 | Conductive polymer | 0B | $8 \times 10^{10}$ | 111.0 | 69.3 |
| C. Ex. 7 | — | 20 | Conductive polymer | 0B | $7 \times 10^{10}$ | 109.9 | 60.3 |

*Relative to 100 parts by weight of acrylate-based binder (on the basis of solids content)

As can be seen from the above table, the composite films of Examples 1 to 4 had high adhesive strength between the functional layer and the base film. They were excellent in performance in terms of antistatic, antifouling, and chemical resistant functions.

In contrast, the composite film of Comparative Example 1 had very low antistatic function even though the adhesive strength between the functional layer and the base film was high. The composite films of Comparative Examples 2 to 7 had good antistatic and antifouling functions, whereas they lacked chemical resistance. In particular, they had very poor adhesive strength between the functional layer and the base film.

The invention claimed is:

1. A cover window of a display device comprising a base film; and a functional layer formed on the base film, wherein the functional layer comprises an acrylate-based binder and an acrylamide-based monomer which are cured, wherein the acrylamide-based monomer is included in an amount of 10 parts by weight to 20 parts by weight based on 100 parts by weight of the acrylate-based binder, wherein the acrylamide-based monomer is N,N-dimethylacrylamide, and wherein the functional layer has a surface resistance of $1\times10^{13}$Ω/□ or less and a cross-cut test result of 3B or more when measured for the surface of the functional layer according to the ASTM D3359 standard.

2. The cover window of claim 1, wherein the water contact angle measured when an eraser for an abrasion resistance test is rubbed 3,000 times with a load of 1 kg in a state in which 10 μl of ethanol with a purity of 99.5% or more is applied to the surface of the functional layer is 95° or more.

3. The cover window of claim 1, wherein the acrylate-based binder comprises a urethane acrylate-based oligomer and an acrylate-based monomer.

4. The cover window of claim 1, wherein the functional layer further comprises an antistatic agent.

5. The composite film of claim 4, wherein the functional layer further comprises at least one selected from the group consisting of an antifouling agent, a UV absorber, and a photoinitiator.

6. The cover window of claim 1, wherein the functional layer is directly formed on the surface of the base film.

7. The cover window of claim 1, wherein the base film comprises at least one selected from the group consisting of a polymer film or ultra-thin glass (UTG).

8. A display device, which comprises a display panel; and a cover window disposed on the front side of the display panel, wherein the cover window comprises a composite film, which comprises a base film, and a functional layer formed on the base film, wherein the functional layer comprises an acrylate-based binder and an acrylamide-based monomer which are cured, wherein the acrylamide-based monomer is included in an amount of 10 parts by weight to 20 parts by weight based on 100 parts by weight of the acrylate-based binder, wherein the acrylamide-based monomer is N,N-dimethylacrylamide, and wherein the functional layer has a surface resistance of $1\times10^{13}\Omega/\square$ or less and a cross-cut test result of 3B or more when measured for the surface of the functional layer according to the ASTM D3359 standard.

* * * * *